US012805987B2

(12) United States Patent
Bulard

(10) Patent No.: US 12,805,987 B2
(45) Date of Patent: Nov. 24, 2026

(54) METHOD OF FINALIZING 3D PRINTED PROSTHESES, PROSTHESES PRODUCED THEREBY, AND INSTALLATION THEREOF

(71) Applicants: Park Dental Research Corporation, Ardmore, OK (US); Ronald A. Bulard, Ardmore, OK (US)

(72) Inventor: Ronald A. Bulard, Ardmore, OK (US)

(73) Assignee: Park Dental Research Corporation, Ardmore, OK (US)

( * ) Notice: Subject to any disclaimer, the term of this patent is extended or adjusted under 35 U.S.C. 154(b) by 96 days.

(21) Appl. No.: 18/718,987

(22) PCT Filed: Dec. 13, 2022

(86) PCT No.: PCT/US2022/052682

§ 371 (c)(1),
(2) Date: Jun. 12, 2024

(87) PCT Pub. No.: WO2023/114196

PCT Pub. Date: Jun. 22, 2023

(65) Prior Publication Data

US 2025/0041031 A1 Feb. 6, 2025

Related U.S. Application Data

(60) Provisional application No. 63/288,735, filed on Dec. 13, 2021.

(51) Int. Cl.

| | |
|---|---|
| ***A61C 13/00*** | (2006.01) |
| ***A61C 13/20*** | (2006.01) |
| ***B29C 64/118*** | (2017.01) |
| ***B29C 64/129*** | (2017.01) |
| ***B29C 64/30*** | (2017.01) |
| ***B29C 71/00*** | (2006.01) |
| ***B29C 71/04*** | (2006.01) |
| ***B29K 33/00*** | (2006.01) |
| ***B29K 77/00*** | (2006.01) |
| ***B29K 105/00*** | (2006.01) |
| ***B29L 31/00*** | (2006.01) |
| ***B33Y 10/00*** | (2015.01) |
| ***B33Y 40/20*** | (2020.01) |
| ***B33Y 80/00*** | (2015.01) |

(52) U.S. Cl.

CPC .......... *A61C 13/0019* (2013.01); *A61C 13/20* (2013.01); *B29C 71/0009* (2013.01); *B33Y 10/00* (2014.12); *B33Y 40/20* (2020.01); *B33Y 80/00* (2014.12); *B29C 64/118* (2017.08); *B29C 64/129* (2017.08); *B29C 64/30* (2017.08); *B29C 71/04* (2013.01); *B29K 2033/00* (2013.01); *B29K 2077/00* (2013.01); *B29K 2105/0002* (2013.01); *B29L 2031/7536* (2013.01)

(58) Field of Classification Search

CPC ....... A61C 13/20; A61C 13/087; B33Y 10/00; B33Y 40/20; B33Y 80/00; B33Y 70/00; B29C 64/118; B29C 64/129; B29C 64/30; B29C 71/0009; B29C 71/04; B29C 64/106; B29C 64/35; B29K 2033/00; B29K 2077/00; B29K 2105/0002; B29L 2031/7536; B24C 9/006; B24C 11/00; B24C 1/08

See application file for complete search history.

(56) References Cited

U.S. PATENT DOCUMENTS

| | | | | |
|---|---|---|---|---|
| 3,828,478 | A | 8/1974 | Bemis | |
| 12,194,684 | B2 * | 1/2025 | Kono | B22C 9/043 |
| 2013/0171431 | A1 | 7/2013 | Swartz et al. | |
| 2014/0131908 | A1 * | 5/2014 | Sun | A61C 13/0013 264/16 |
| 2017/0210063 | A1 | 7/2017 | Andres et al. | |
| 2019/0307534 | A1 * | 10/2019 | Schwitalla | A61C 8/0016 |
| 2019/0322898 | A1 * | 10/2019 | Hutchinson | B33Y 40/00 |
| 2020/0397544 | A1 * | 12/2020 | Bulard | A61C 13/087 |
| 2021/0022867 | A1 * | 1/2021 | Shimko | B33Y 70/00 |
| 2024/0342995 | A1 * | 10/2024 | Joshi | A61C 7/002 |

FOREIGN PATENT DOCUMENTS

| | | | | |
|---|---|---|---|---|
| CN | 106002642 A | | 10/2016 | |
| WO | WO-2019046846 A1 | * | 3/2019 | B33Y 10/00 |

* cited by examiner

*Primary Examiner* — Nahida Sultana

(74) *Attorney, Agent, or Firm* — Norris McLaughlin, P.A.

(57) ABSTRACT

The present invention relates to a method of finalizing a 3D printed dental prosthesis by subjecting the dental prosthesis to a pressurized water stream comprising glass beads. Also disclosed is a 3D printed dental prosthesis or component thereof prepared by the inventive method; and a method of providing a patient in need thereof with the 3D printed dental prosthesis or component thereof by inserting same into the oral cavity of the patient.

5 Claims, No Drawings

METHOD OF FINALIZING 3D PRINTED PROSTHESES, PROSTHESES PRODUCED THEREBY, AND INSTALLATION THEREOF

PRIORITY CLAIM

This application is a 371 of International Patent Application No. PCT/US2022/052682, filed Dec. 13, 2022, which claims priority of U.S. Provisional Application Ser. No. 63/288,735, filed Dec. 13, 2021, the entire contents of which patent applications are hereby incorporated herein by reference.

FIELD OF THE DISCLOSURE

The present invention relates to a method for finalizing 3D printed prostheses.

BACKGROUND OF THE DISCLOSURE 3D printing has been used to print dental prostheses, for example, dentures and implants. However, where the printing ink does not comprise a metal, for example, titanium, but, rather, comprises polymerizable resins, the dental prostheses can be weak and often suffer the problem that in use they cannot withstand the forces of mastication.

For example, in stereolithography (SLA), a laser is used to solidify liquid resin with ultraviolet light. The laser beam draws out a slice of the developing 3D part to cure the liquid resin layer by layer, ultimately generating the 3D part.

Most resins, when they cure, are usually very brittle, and cannot withstand much force, so SLA printing is usually useful when it comes to prototyping, but not production. This is a significant limitation on the process, since the attractiveness of SLA printers is that their precision allows printing of very intricate, delicate structures, which makes the technique an ideal candidate for the 3D printing of dental prostheses were it not for the aforementioned limitations.

My prior application, first published as WO 2019/046846, the entire contents of which are hereby incorporated herein by reference, describes the post-printing treatment of the 3D printed prosthesis with ionizing radiation, for example, cobalt 60, to increase the strength of the 3D printed prosthesis.

Other types of 3D printing processes are known and used in dentistry. For example, material extrusion involves molten material being extruded through a nozzle. Most of the time that material is a plastic filament pushed through a heated nozzle, melting it in the process. The printer deposits the material on a build platform along a predetermined path, where the filament then cools and solidifies to form a solid object. A variety of materials can be extruded in this fashion, including metal paste, but plastics are the most common materials used, particularly in dentistry. Dental prostheses prepared in this manner, for example, from extruded nylon, tend to be stronger and cobalt 60 treatment can be avoided in most cases.

Nevertheless, no matter which particular 3D printing process is utilized, 3D printed prostheses prepared using the known techniques will typically require finalizing, for example, by smoothing rough edges and polishing. Polishing provides a very smooth surface, but typically involves the use of abrasives. I have found that these abrasives have the undesirable tendency to remove material from the 3D printed prostheses, even where the 3D printed prostheses have been subjected to post-printing strengthening using ionizing radiation. This results in some cases in the dimensions of the part being changed to such an extent that the part is no longer useable or, if useable, the exact fitting in the user's mouth that was envisioned is not obtained.

It is an object of the present invention to improve upon these disadvantages and to provide a process for finalizing the 3D printed prostheses in such a way that a smooth surface is obtained but without significant changes in the calculated dimensions of the part.

SUMMARY OF THE DISCLOSURE

The present invention relates in one embodiment to a method of finalizing a 3D printed dental prosthesis, said method comprising subjecting the dental prosthesis to a pressurized water stream comprising glass beads.

The present invention relates in another embodiment to a dental prosthesis prepared by the inventive finalizing method.

The present invention relates in yet another embodiment to a method of providing a dental patient with a dental prosthesis, the method comprising:

(a) preparing a dental prosthesis utilizing the inventive finalizing method; and (b) installing the dental prosthesis into the oral cavity of said patient.

DETAILED DESCRIPTION OF THE PREFERRED EMBODIMENTS

In a preferred embodiment, a pressurized water stream is directed against the dental prosthesis operating at a pressure of 10-200 pounds per square inch, preferably 40 to 100 pounds per square inch, most preferably 50 to 80 pounds per square inch, especially 60 to 70 pounds per square inch.

The pressured water stream comprises glass beads of a suitable size to accomplish to desired smoothing effect. In a preferred embodiment, the glass beads have a diameter ranging from 0.0005 to 0.0100 inch, more preferably 0.0010 to 0.0060 inch, most preferably from 0.0015 to 0.0040 inch. Grit size can vary from #7 to #1200, more preferably from #60 to #400, most preferably from #80 to #325, where #80, #100-#170, and #170-#325 can be mentioned specifically.

In a preferred embodiment, the pressurized water stream comprises 1 to 10 pounds of glass beads per gallon of water, preferably 3 to 8 pounds of glass beads per gallon of water, most preferably 5 to 6 pounds of glass beads per gallon of water. Processing can be carried out in a suitable apparatus that allows recycling of the glass beads and, optionally, also the water.

In a particularly preferred embodiment, once the desired smooth surface effect on the dental prosthesis is achieved by the action of the pressurized water stream comprising glass beads, the treated dental part can be made ready for use simply by rinsing the dental part in water and drying. In this way, I have discovered that it is possible to avoid polishing with abrasive materials and in an especially preferred embodiment, the inventive method does not involve polishing with abrasive materials.

The power of 3D printing is that dental prostheses can be prepared to exact dimensions. This advantage is lost if the post-printing processing involves the removal of material. Such removal changes the pre-printed calculated dimensions of the dental part and can render the finalized dental part unusable. Accordingly, in another especially preferred embodiment, the inventive finalizing method is carried out in such a way that the post-printing dimensions of the 3D printed dental prosthesis is substantially unchanged by subjecting the dental prosthesis to the pressurized water stream comprising glass beads. By "substantially unchanged" means that the process does not cause the actual dental prosthesis dimensions to differ from the pre-printing calculated dental prosthesis dimensions by more than 10%, preferably by more than 5%, most preferably by more than 2%.

The water aids in the achievement of the goals of the invention by protecting the surface of the prosthesis against being abraided by the glass beads. Instead, the water serves as a carrier for the glass beads, causing them to slide across the surface of the prosthesis, rolling and smoothing the prosthesis surface, but not removing prosthesis material to any significant degree. The result is a highly polished surface that maintains the prosthesis dimensions significantly as originally calculated.

The dental prosthesis can be 3D printed by any technique known in the art using conventional materials known in the art.

In one preferred embodiment, the dental prosthesis is 3D printed from suitable materials by material extrusion.

In another preferred embodiment, the dental prosthesis is 3D printed from polymerizable resins.

In the material extrusion process, all suitable materials can be utilized, including metal paste and plastics, such as, for example, polylactic acid (PLA), acrylonitrile butadiene styrene (ABS), polyethylene terephthalate (PET), polyethylene terephthalate glycol (PETG), thermoplastic polyurethane (TPU), nylon, acrylonitrile styrene acrylate (ASA), polycarbonate (PC), high impact polystyrene (HIPS), and other similar materials.

In a preferred embodiment, the dental prosthesis is prepared by a method comprising:

- (a) 3D printing a dental prosthesis or a component of a dental prosthesis by extruding a material through a heated nozzle to yield melted material;
- (b) depositing the melted material on a build platform along a predetermined path to form the dental prosthesis; and
- (c) allowing the melted material to cool and solidify.

In a most preferred embodiment, the extrudate is a nylon. The materials being extruded then comprise monomers used to the make the nylon, including amine, hexamethylene diamine, and adipic acid.

In another preferred embodiment, the dental prosthesis is prepared by a method comprising:

- (a) 3D printing a dental prosthesis or a component of a dental prosthesis using a polymerizable resin ink with layer-by-layer curing with light.

In a preferred embodiment, the dental prosthesis 3D printed from polymerizable monomers is prepared by a method comprising:

- (a) 3D printing a dental prosthesis or a component of a dental prosthesis using a polymerizable resin ink with layer-by-layer curing with light; and thereafter
- (b) subjecting the dental prosthesis or component thereof obtained in (a) to ionizing radiation radiation.

Suitable polymerizable resins are well-known in the art, as are polymerizable compositions containing them, the ingredients of such compositions, including suitable monomers and photoinitiators, and the operable conditions for preparing light-cured 3D printed dental prostheses and components thereof. Accordingly, these details are not repeated here. See, for example, the following patent publications: US 2009/0148813; US 2014/0131908; US 2014/0239527; US 2016/0113846; US 2016/0288376; and US 2016/0332367, the entire contents of which published applications are hereby incorporated herein by reference.

In an especially preferred embodiment, the polymerizable resin ink comprises polymerizable (meth)acrylate monomers.

In another especially preferred embodiment, the curing with light involves ultraviolet light.

Examples of the ionizing radiation to be applied to the 3D printed dental prosthesis or component thereof include alpha-rays, beta-rays, gamma-rays, electron beams, neutron rays, and X-rays.

The irradiation of ionizing radiation is performed using an ionizing radiation irradiation apparatus, and the dose of irradiation is usually 5 to 300 kGy, preferably 20 to 60 kGy. The time is that necessary to bring about the aforementioned structural changes, which depends on the dose selected, is generally anywhere from a few seconds, for example, 10 seconds, or 30 seconds, or 60 seconds, until an hour or more, preferably from 40-50 minutes.

In an especially preferred embodiment, the ionizing radiation is gamma radiation.

In a more preferred embodiment, the gamma radiation is Cobalt-60. An advantage of the use of Cobalt-60, is that the irradiators used produce very little heat, if any, and, therefore, the overall process involves little or no heat. This is different than, for instance, crosslinking with electromagnetic curing methods, for example, microwaves, which generate significant heat to cure the resins.

In an especially preferred embodiment, the Cobalt-60 is used in a dosage of 20-60 kGy.

In a most preferred embodiment, the Cobalt-60 dosage is about 25 kGy.

In a most preferred embodiment, the 3D printing is of a polymerizable mixture of (meth)acrylates and a photoinitiator built up layer-by-layer to form a dental prosthesis, especially a denture, under the curing effect of UV-light, and the dental prosthesis so produced is subjected to a dose of 20 to 60 kGy Cobalt-60 for 40-50 minutes, and finalized by treatment with (a) a pressurized water stream comprising glass beads followed by (b) rinsing with water, wherein the pressurized water stream operates at 60 to 70 pounds per square inch, comprises glass beads having a diameter ranging from 0.0017 to 0.0035 inch, and contains 5 pounds of such glass beads in each 2 gallons of water utilized.

The disclosure will now be described in greater detail with reference to the following non-limiting examples.

EXAMPLES

Example 1

A polymerizable dental material is prepared by combining polyester acrylate, aliphatic epoxy diacrylate, trimethylolpropanetriacrylate, iso-bornyl acrylate, phosphine oxide, and methanone. A denture is 3D printed from the polymerizable dental material using the Juell™ 3D-2 printer available from Park Dental Research Corporation, Ardmore, Oklahoma, UV-light-curing layer-by-layer during the build. Upon completion, the denture is subjected to a 25 kGy dose of Cobalt-60 radiation for a period of about 45 minutes. After the Cobalt-60 treatment, the denture is turned, until the desired smoothness is obtained, in a pressurized water stream operated at a pressure of 60 to 70 pounds per square inch and comprising 5 pounds of glass beads having a diameter of 0.0017 to 0.0035 inch per each 2 gallons of water utilized. The finalized denture is rinsed with water and dried and is ready for installation in the patient.

Example 2

A dental implant is prepared by introducing amine, hexamethylene diamine, and adipic acid to an extruder. The nylon extrudate is laid down in the form of the dental implant and allowed to cool and solidify. The unfinished dental implant is turned, until the desired smoothness is obtained, in a pressurized water stream operated at a pressure of 60 to 70 pounds per square inch and comprising 5 pounds of glass beads having a diameter of 0.0017 to 0.0035 inch per each 2 gallons of water utilized. The finalized dental implant is rinsed with water and dried and is ready for installation in the patient.

While the present disclosure has been described in conjunction with the specific embodiments set forth above, many alternatives, modifications and other variations thereof will be apparent to those of ordinary skill in the art. All such alternatives, modifications and variations are intended to fall within the spirit and scope of the present disclosure.

I claim:

1. A method comprising:

(a) 3D printing a dental prosthesis using a polymerizable resin ink with layer-by-layer curing with light;

(b) subjecting the dental prosthesis obtained in (a) to ionizing radiation to obtain an unfinished dental prosthesis, wherein the ionizing radiation is gamma radiation, and the gamma radiation is Cobalt-60; and (c) turning the unfinished dental prosthesis in a pressurized water stream to obtain a finalized dental prosthesis.

2. The method according to claim 1, wherein the polymerizable resin ink comprises polymerizable (meth)acrylate monomers.

3. The method according claim 1, wherein the curing with light involves ultraviolet light.

4. The method according to claim 1, wherein the Cobalt-60 is used in a dosage of 20-60 kGy.

5. The method according to claim 1, wherein the Cobalt-60 dosage is about 25 kGy.

* * * * *